United States Patent

[11] 3,594,507

[72] Inventor William T. Clark, III
6 Davis Blvd., New Orleans, La. 70121
[21] Appl. No. 870,414
[22] Filed Oct. 22, 1969
[45] Patented July 20, 1971
Continuation-in-part of application Ser. No. 617,324, Feb. 20, 1967, now abandoned.

[54] FEEDBACK ELIMINATING DEVICE FOR AUDIO AMPLIFYING SYSTEMS
11 Claims, 1 Drawing Fig.

[52] U.S. Cl. .......... 179/1 FS
[51] Int. Cl. .......... H04m 1/20
[50] Field of Search .......... 179/1 FS

[56] References Cited
UNITED STATES PATENTS

| | | | |
|---|---|---|---|
| 1,938,067 | 12/1933 | Davis | 325/411 |
| 2,157,178 | 5/1939 | Kellogg | 179/1 (FS) |
| 2,166,775 | 7/1939 | Varley | 179/1 (FS) |
| 2,542,921 | 2/1951 | Giannini | 179/1 (FS) X |
| 2,545,466 | 3/1951 | Jeanlin | 179/1 (FS) |
| 2,878,314 | 3/1959 | Laurence | 179/1 (FS) |
| 3,105,877 | 10/1963 | Miller et al. | 179/1 (FS) |
| 3,437,943 | 4/1969 | Mader | 330/10 |

*Primary Examiner*—Kathleen H. Claffy
*Assistant Examiner*—Douglas W. Olms
*Attorney*—James H. Littlepage

ABSTRACT: An audio amplifying system, including a loud speaker from which an acoustical signal would normally be fed back to a microphone, is provided with an oscillator so coupled to the input of the amplifier so as to disable the amplifier at a supersonic rate, during periods in which the acoustical feedback signals from the loudspeaker arrive back at the microphone. An amplitude discrimination system inhibits operation of the amplifier disabling oscillator when signals of predetermined amplitude are output from the amplifier, and one or more filters in the amplifier input circuit exclude amplification of acoustical feedback signals of the frequency at which the amplifier is disabled.

PATENTED JUL 20 1971 3,594,507
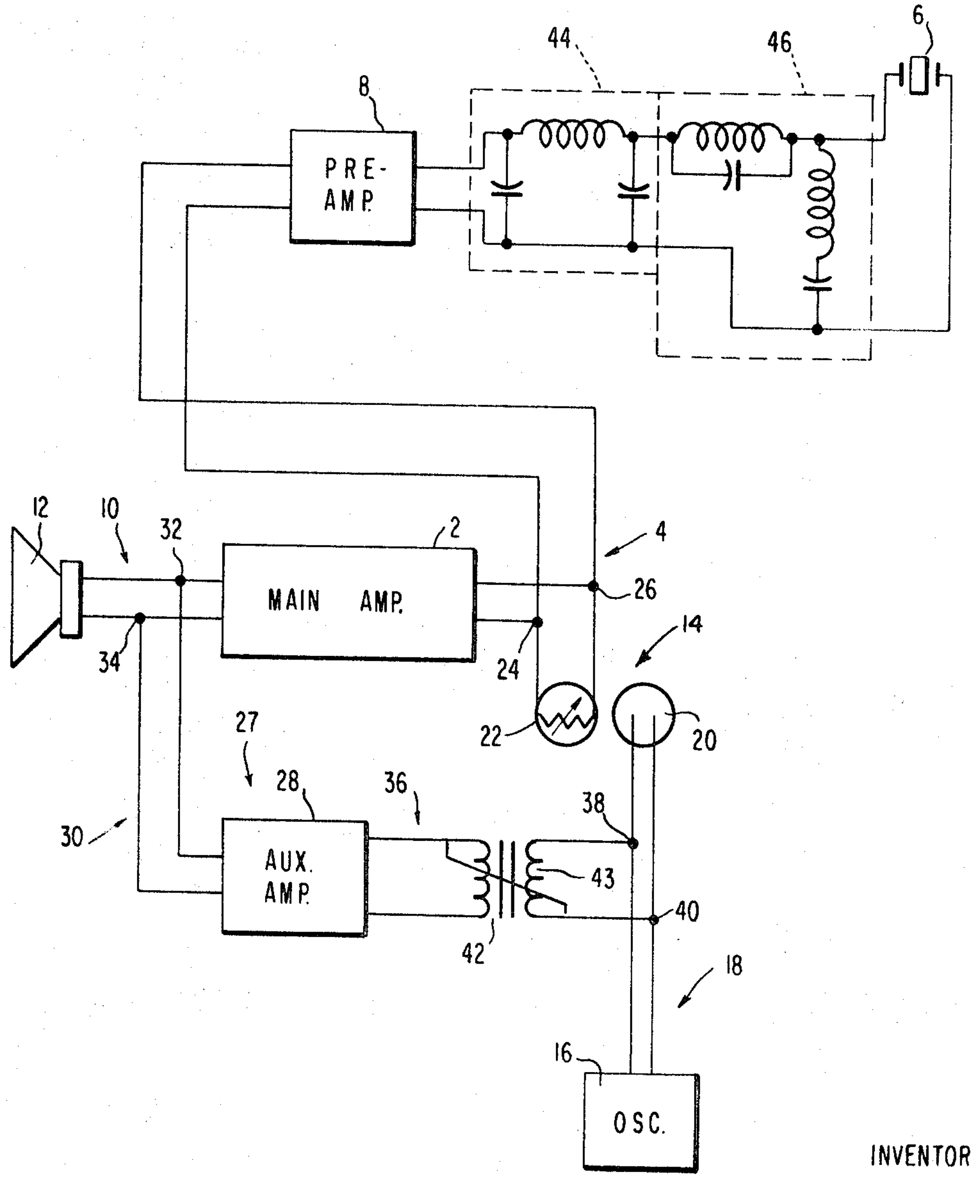
INVENTOR
WILLIAM T. CLARK, III
BY James H. Littlepage
ATTORNEY

FEEDBACK ELIMINATING DEVICE FOR AUDIO AMPLIFYING SYSTEMS

RELATED APPLICATIONS

This application is a continuation in part of Ser. No. 617,324 filed Feb. 20, 1967, now abandoned, for Feedback Eliminating Device for Audio Systems.

FIELD OF INVENTION

Acoustics, Miscellaneous.

PRIOR ART

U.S. Pat. Davis No. 1,938,067; Offner No. 2,931,985; Alexander et al. No. 3,215,824; Harkenridger et al. No. 3,383,617; and Nader No. 3,437,943.

OBJECTS

Heretofore, most arrangements for preventing feedback in audio systems resulting from proximity of a loudspeaker to a microphone have entailed use of signal attenuating devices, directional loudspeakers and microphones, or merely the reduction of amplifier gain, most or all to the detriment of desired functions of the system, and all more or less ineffective. The object now is to provide a feedback preventing system which permits operation of an audio amplifier at its desired level of gain, although its loudspeaker and microphone be in such proximity to one another as to be in what may be termed "acoustical feedback relationship," i.e., close enough so that an acoustical signal returning from the loudspeaker to the microphone will be picked up by the microphone and reamplified by the amplifier so as to cause the all-too familiar ringing, howling and reverberation.

In its broadest aspect, the invention contemplates the use of an oscillator and a coupling circuit so connected to the input of the amplifier so that the latter will be disabled at a supersonic rate, wherein the periods of disability of the amplifier input are so related to the transit time of the acoustical signals returning from the loudspeakers to the microphones that the amplifier input is disabled during the intervals that the acoustical feedback signals impinge upon the microphone.

Another object stems from the fact that acoustical feedback regeneration generally starts with a relatively low-level acoustical feedback signal, (first appearing at the output of the amplifier in low amplitude wave form) resulting from relatively small noise or hum in the amplifier, and oftentimes absent a desired audio input signal voice, music, etc.) at the microphone, whereas desired audio signals input to the microphone usually appear at the amplifier output in relatively high amplitude waveform. Taking these phenomena into account, it is intended to provide, in conjunction with the oscillator and its coupling for normally disabling the amplifier input at the supersonic rate, an amplitude discriminating feedback loop responsive to the amplitude of the electrical signal appearing at the output of the amplifier, and which will inhibit operation of the amplifier supersonic input disabling circuit when the amplifier output is of high amplitude, i.e., when the amplifier is responding to desired audio input at the microphone; and when the amplifier output is at low amplitude, the feedback loop aids the amplifier disabling circuit.

Still another object is to provide in conjunction with the amplifier input disabling circuit, one or more filters in the input circuit between the microphone and the amplifier, one of which is a trap filter center-tuned to the frequency at which the amplifier input is disabled, and another which is a low band-pass filter which will pass only those input signals which are below some predetermined frequency which is less than the frequency at which the amplifier input is disabled. Either one or both types of filters may be used to insure that the acoustical feedback signal, which is a train of signal bursts occurring at a supersonic frequency, will not get through from the microphone to the amplifier.

These and other objects will be apparent from the following specification and drawing, in which the sole FIGURE is a circuit diagram of an audio amplifying system incorporating the improvements referred to above and described below.

Referring now to the drawing, the audio amplifying system includes a main amplifier 2 having an input circuit 4 to which a microphone 6 is connected. If desired, there may be used ahead of the main amplifier a preamplifier 8. Main amplifier 2 has an output circuit 10 to which a loudspeaker 12 is connected. The improvements described below are used so that, if the microphone 6 and loudspeaker 12 are in such proximity to one another that acoustical feedback signals from loudspeaker 12 and microphone 6 would ordinarily start up a regenerative ringing or howling, such signals are prevented from doing so.

The improvement, in its first aspect, constitutes an oscillator 16 preferably variable in frequency, and capable of producing signals in the range of about 15,000 cycles to at least 30,000 cycles per second, i.e., above the normal range of hearing. Oscillator 16 has an output circuit 18 connected to a gaseous discharge lamp 20, such as a neon lamp, which illuminates once (or perhaps twice if it functions as a doubler) for each cycle of the oscillator output. Ideally, the "on" and "off" times of the lamp should be about equal. Disposed adjacent glow tube 20 is a photoresistor 22 which is normally of high impedance, but whose impedance drops to some nominal low value when excited by light from glow tube 20. Photoresistor 22 is connected at 24 and 26 across the input circuit 4 for main amplifier 2. It will thus be apparent that, when illuminated, photoresistor 22 forms a low impedance shunt across the input circuit 4 of main amplifier 2, and the latter will be disabled each time the photoresistor 22 is excited by illumination from lamp 20, and that these disablements will occur in the frequency to which oscillator 16 is set. In the operation of the circuit thus far described, the microphone 6 and loudspeaker are arranged at their desired locations in their environment, for example an auditorium, and main amplifier 2 is turned on with its gain sufficiently high that an acoustical feedback howl is set up. Oscillator 16 is energized and its frequency is empirically adjusted until the feedback howl stops. It will thus be set to oscillate at a frequency that is directly related to the transit time for an acoustical signal burst to return from loudspeaker 12 to microphone 6; and since the disablements of the amplifier input circuit occur at an inaudible rate, they have little if any derogatory effect upon the quality of the audio signal heard by a listener.

As one refinement, there is provided an amplitude discriminating circuit 27 which inhibits operation of the main amplifier disabling circuit when the main amplifier output signal is of high amplitude. For this purpose there is an auxiliary amplifier 28 having an input circuit 30 connected at 32, 34 across the output circuit 10 of main amplifier 2, and an output circuit 36 connected as at 38 and 40 to the output circuit 18 of oscillator 16 through a saturable step-up transformer 42. When the output of main amplifier 2 is of low amplitude (when there is no desired acoustical signal input to microphone 6) the signal output of auxiliary amplifier 28 is also at relatively low amplitude, but is stepped up by transformer 42 and fed into the output circuit 18 of oscillator 16. When of the sign opposite to the instantaneous output of the oscillator, this stepped-up signal overrides the oscillator signal, and when it is of the same sign, the signal aids the oscillator signal. The low amplitude condition prevailing in main amplifier output circuit 10 is a characteristic of the conditions under which a regenerative feedback ring or howl starts. However, when the amplitude of the signal appearing in main amplifier output 10 is high, (which is its characteristic when there is a desired acoustical signal input to the microphone) the amplitude in the output of auxiliary amplifier 28 is correspondingly high, and sufficiently high as to saturate transformer 42, whereupon the impedance of its secondary winding 43 drops, and the secondary winding 43 functions as a low impedance shunt across oscillator output circuit 18, thereby preventing glow tube 20 from igniting and, consequently, inhibiting operation of the main amplifier disabling circuit 14.

Amplifier discriminating circuit 27 may or may not be used in conjunction with the amplifier disabling circuit 14, depending upon the difficulty of the feedback problem.

As further improvements in conjunction with amplifier disabling circuit 14, one or more types of filters may be utilized in main amplifier input circuit 4 following microphone 6. Indicated at 44 is a low pass filter which will pass input signals of only those frequencies below some predetermined maximum, for example 15,000 cycles. Thus, if oscillator 16 is tuned at, for example, 25,000 cycles, virtually none of the acoustical feedback signals returning from loudspeaker 12 to microphone 6 in bursts occurring at the rate of 25,000 cycles will get through to main amplifier 2. Indicated at 46 is a and elimination filter, preferably center tuned to the frequency to which main amplifier input circuit 4 is disabled by disabling circuit 14. If desired, band elimination filter 46 may be gang tunable with oscillator 16. Assuming again that main amplifier input circuit 4 is disabled at the rate of 25,000 cycles per second, band elimination filter 46 will trap out all signals occurring at the rate of 25,000 cycles and adjacent frequencies so that virtually no signals at 25,000 (which is the rate of the signal bursts from loudspeakers 12) will get through to the main amplifier 2.

Other circuits may be utilized for coupling oscillator 16 to main amplifier 2 so that the latter is disabled at a supersonic rate, and various other filter circuits, and amplitude discriminating devices, all well known in the art, may be utilized for preventing the signal bursts occurring at a supersonic rate in loudspeaker 18 from getting through from microphone 6 to main amplifier 2, or from getting through main amplifier 2 itself.

I claim:

1. In an audio amplifier system, including a main amplifier having input and output circuits, a microphone connected to said input circuit, a loudspeaker connected to said output circuit, the improvement which comprises
- disabling means connected to said main amplifier and capable, when actuated, of rendering the same substantially incapable of energizing said loudspeaker with an amplified signal from said microphone,
- and means for actuating said disabling means at a frequency which, for an acoustical signal, is supersonic,
- whereby to prevent amplification by said main amplifier of acoustical signal bursts fed back from said loudspeaker to said microphone.

2. The combination claimed in claim 1, said disabling means being connected to said input circuit.

3. The combination claimed in claim 1, and filter means in said input circuit for substantially preventing transmission thereby from said microphone to said main amplifier of a signal of the frequency at which said main amplifier is disabled while permitting said transmission at a frequency which, for an acoustical signal, is audible.

4. The combination claimed in claim 3, said filter means comprising a trap filter center tuned substantially to the frequency at which said main amplifier is disabled.

5. The combination claimed in claim 3, said filter means comprising a low band pass filter.

6. The combination claimed in claim 1, and signal amplitude discriminating means responsive to the output of the main amplifier for inhibiting operation of the disabling means in response to a signal of predetermined amplitude in said main amplifier output, said amplitude discriminating means being noninhibitive of said disabling means when responding to a signal of amplitude less than said predetermined amplitude in said main amplifier output.

7. The combination claimed in claim 1,
- said disabling means comprising a photoresistor connected across said input circuit,
- a gaseous discharge lamp disposed in light-transmitting relationship to said photoresistor,
- and an oscillator having an output circuit connected to said gaseous discharge lamp.

8. In the combination claimed in claim 7, an auxiliary amplifier having an input circuit connected to the output circuit of said main amplifier, and an output circuit, a saturable transformer having
- a primary winding connected across the output circuit of the auxiliary amplifier, and
- a secondary winding connected across the output circuit of said oscillator.

9. In the combination claimed in claim 7, said oscillator being tunable to various frequencies, and a trap filter in said input circuit tunable with said oscillator to the frequency at which said main amplifier is disabled.

10. The method of deterring acoustical feedback in an audio amplifying system which includes a microphone, an amplifier and a loudspeaker, which comprises, periodically disabling the amplifier at a supersonic rate, wherein the periods of disability of the amplifier coincide with the incidence at the microphone of acoustical signals returning from the loudspeaker.

11. In combination with an audio amplifier system including a microphone, an amplifier, and a loudspeaker, wherein the loudspeaker and microphone are juxtaposed in sufficiently close proximity to one another so as to normally give rise to regenerative feedback, the improvement which comprises means for periodically disabling said amplifying system at an inaudible rate, whereby to produce at said loudspeaker a series of acoustical signal bursts time-spaced from one another, wherein the periods of disability of the amplifying system correspond to the incidence at said microphone of said acoustical signal bursts from said loudspeaker.